(12) United States Patent
Morgana

(10) Patent No.: US 6,377,711 B1
(45) Date of Patent: Apr. 23, 2002

(54) METHODS AND SYSTEMS FOR DETECTING THE EDGES OF OBJECTS IN RASTER IMAGES USING DIAGONAL EDGE DETECTION

(75) Inventor: Stephen C. Morgana, Brockport, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/343,528

(22) Filed: Jun. 30, 1999

(51) Int. Cl.[7] .............................. G06K 9/00; G06K 9/36; G06K 9/40; G06K 9/68
(52) U.S. Cl. ........................ 382/274; 382/167; 382/199; 382/205; 382/218; 382/266; 382/284; 358/1.2; 358/1.9
(58) Field of Search ................................. 382/162, 167, 382/181, 199, 205, 218, 254, 256–257, 266, 274, 284, 308; 358/1.1, 1.2, 1.9

(56) References Cited

U.S. PATENT DOCUMENTS

| | | | | |
|---|---|---|---|---|
| 5,333,211 A | * | 7/1994 | Kanda et al. ................ | 382/261 |
| 5,542,052 A | * | 7/1996 | Deutsch et al. .............. | 345/431 |
| 5,581,667 A | * | 12/1996 | Bloomberg .................. | 358/1.9 |
| 5,613,046 A | * | 3/1997 | Dermer ........................ | 358/1.9 |
| 5,956,157 A | * | 9/1999 | Tai .............................. | 358/455 |
| 6,141,462 A | * | 10/2000 | Yoshino et al. ............. | 382/284 |
| 6,195,467 B1 | * | 2/2001 | Asimopoulos et al. ...... | 382/261 |

* cited by examiner

Primary Examiner—Leo Boudreau
Assistant Examiner—Daniel G. Mariam
(74) Attorney, Agent, or Firm—Oliff & Berridge, PLC

(57) ABSTRACT

Trapping methods and systems for raster images along horizontal, vertical or diagonal directions uses edge detection for detecting edges between pixels and only diagonally neighboring pixels.

17 Claims, 6 Drawing Sheets

METHODS AND SYSTEMS FOR DETECTING THE EDGES OF OBJECTS IN RASTER IMAGES USING DIAGONAL EDGE DETECTION

BACKGROUND OF THE INVENTION

1. Field of Invention

This invention generally relates to processing a color image.

2. Description of Related Art

Images are stored as discrete picture elements, or pixels, with each pixel corresponding to an identified image point and represented by a pixel value. An entire set of pixels representing an image is referred to as a bitmap (for binary pixel values) or a bytemap (for multi-bit pixel values) of the image. Color pixel values generally include information such as values for attributes such as hue, color and saturation. This information can be supplied directly to display devices, such as cathode ray tube (CRT) displays, that can directly represent each pixel's information.

However, polychromatic or color printing generally involves separately printing successive layers of colored inks. Each layer of ink is applied over the previous layer. The number of stages for printing an image depends upon the color model chosen. In the most common color model, subtractive color printing, separate cyan (c), magenta (m), yellow (y) and sometimes black (k) ink layers are successively applied.

Thus, in order to represent a polychromatic image, the image is first broken down into a set of monochromatic images, each of which corresponds to the contribution of a particular color (cyan, magenta, yellow or black) to the overall image. The quality of the image depends on the mechanical precision with which the printer registers the successive ink layers.

SUMMARY OF THE INVENTION

A raster is a two-dimensional pattern, divided into a discrete number of positions that cover an image area. Trapping is a technique of intentional overlapping adjacent colored objects on a page to cover up printer registration errors. Printer misregistration can occur in the horizontal, vertical and diagonal directions. Any trapping solutions must provide overlap in edges along each of these directions.

In conventional trapping methods, diagonal, vertical and/or horizontal edges between pixels are located and then the pixel values are adjusted to reduce or eliminate the effects of misregistration of the various colored layers with respect to each other.

The following U.S. patents, each of which is incorporated herein by reference in its entirety, disclose methods of detecting locations to trap based on raster data: U.S. Pat. Nos. 5,615,314; 5,513,300; 5,440,652; 5,386,483; 5,386,223; 5,295,236; 5,241,396; 5,131,058; 4,931,861; 4,725,966; 4,700,399; and 4,583,116. For example, U.S. Pat. No. 4,700,399 to Yoshida discloses a color image processing apparatus including a detector for detecting an edge of an image. The Yoshida edge detector detects edges in yellow, magenta and cyan color signals using a Laplacian algorithm. An edge quantity is calculated as the sum of differences between a density level for a pixel and the densities of the eight adjacent pixels.

Known raster-based trapping solutions only look for edges between each pixel and its four vertically and horizontally connected neighbors (e.g., horizontal and vertical edges). FIGS. 1 and 2 illustrate the effect of trapping only horizontal and vertical edges. In FIG. 1, a conventional edge detecting system scans for edges between a central or target pixel, or a pixel of interest, 22 and adjacent or neighboring pixels 12, 21, 23 and 32. An edge between the target pixel 22 and one of the adjacent pixels 11, 13, 31 and/or 33 would not be detected. This can lead to corners being knocked out of the trap overlap region, allowing "white" space to be shown under diagonal misregistration. This is illustrated in FIG. 2, which shows a processed set of pixels including an object 122 bounded by an edge 141. As can be seen, the processing has left the corners 143–146 "unprocessed".

An improved system achieves horizontal, vertical and diagonal trapping by looking for edges between pixels, such as the target pixel 22, and the eight connected neighboring pixels, such as the pixels 11, 12, 13, 21, 23, 31, 32 and 33, that are adjacent to the target pixel 22, as shown in FIGS. 3 and 4. This conventional system removes the possibility for missing corners, as can occur in the example shown in FIGS. 1 and 2. However, the improved system requires additional time to conduct the edge detecting routines. This additional time is considerable when detecting edges for each pixel in the image.

Thus, the known approaches to edge detection, including those represented in FIGS. 1–4, have been found to be excessive in most situations.

This invention provides systems and methods for trapping raster images using only diagonal edge detection.

This invention separately provides methods and systems that look for edges between pixels by selecting a target pixel and looking at two neighboring pixels adjacent to the selected pixel.

This invention separately provides methods and systems which perform edge detecting routines much faster than the conventional edge detecting approaches.

These and other features or advantages of this invention are described in or are readily apparent from the following detailed description of the various exemplary embodiments.

BRIEF DESCRIPTION OF THE DRAWINGS

Various exemplary embodiments of this invention will be described in detail, with reference to the following drawing figures, in which.

DETAILED DESCRIPTION OF EXEMPLARY EMBODIMENTS

This invention includes methods and systems that look for edges between pixels by selecting each pixel and comparing the color attributes, such as such as hue, brightness, saturation and/or the amount of cyan, magenta, yellow and black colorants of the pixel with two diagonally neighboring pixels. The two neighboring pixels are non-colinear with respect to the selected pixel.

Figure 5:
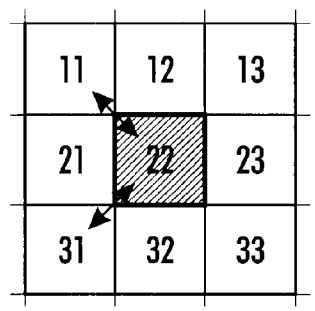
FIG. 5 illustrates one exemplary embodiment of the process and system for edge detection in accordance with this invention.

FIG. 5 generally illustrates one exemplary embodiment of the methods and systems for determining if trapping of raster images along horizontal, vertical or diagonal directions is required according to this invention. The methods and systems according to this invention scan for edges between pixels and, for example, their upper left and lower left diagonal neighbors. There are both horizontal and vertical components in each of these two tests. Thus, in most applications, the required edges are detected. The need to only conduct two tests, rather that the four or eight tests, as in the conventional systems and methods described above, speeds up the overall trapping process considerably.

In the exemplary embodiment illustrated in FIG. 5, the two diagonally adjacent pixels are the upper left and lower left diagonal neighbors of the selected pixel. Conventional image processing systems and methods can be used to determine whether an edge exists between, for example, a selected target pixel 22 and its upper left neighboring pixel 11 and its lower left neighboring 31.

The process is repeated for each pixel in the image to determine where the edges in the image are located for each color layer. Alternatively, the process is repeated for a selected sampling of the pixels of the image.

In other exemplary embodiments, the two pixels can be the upper right and lower right diagonally neighboring pixels, for example, the pixels 13 and 33, of the selected pixel 22, the upper left and upper right diagonally neighboring pixels, for example, the pixels 11 and 13, of the selected pixel 22, or the lower right and lower left diagonally neighboring pixels, for example the pixels 31 and 33, of the selected pixel 22.

In still other exemplary embodiments, the two pixels can be spaced a distance from the selected pixel, for example, with one or more diagonal pixels between the selected pixel and each of the two pixels.

Figure 1:
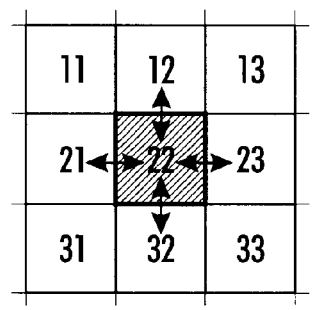
FIG. 1 illustrates conventional trapping for horizontal and vertical edges by scanning for edges between a selected pixel and its four horizontally and vertically connected neighbor pixels.
Figure 2:
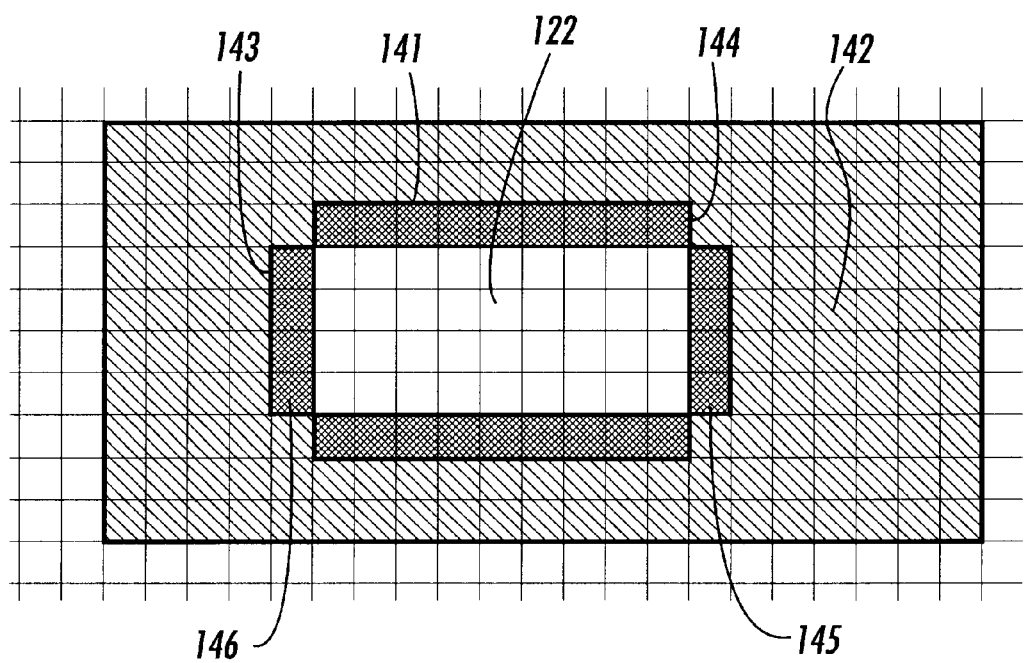
FIG. 2 illustrates the effects of the trapping of FIG. 1 in which corners are knocked out of the trap overlap region.
Figure 3:
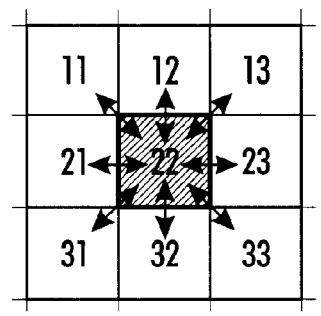
FIG. 3 illustrates conventional trapping by looking for edges between a pixel and all eight of its connected neighbors.
Figure 4:
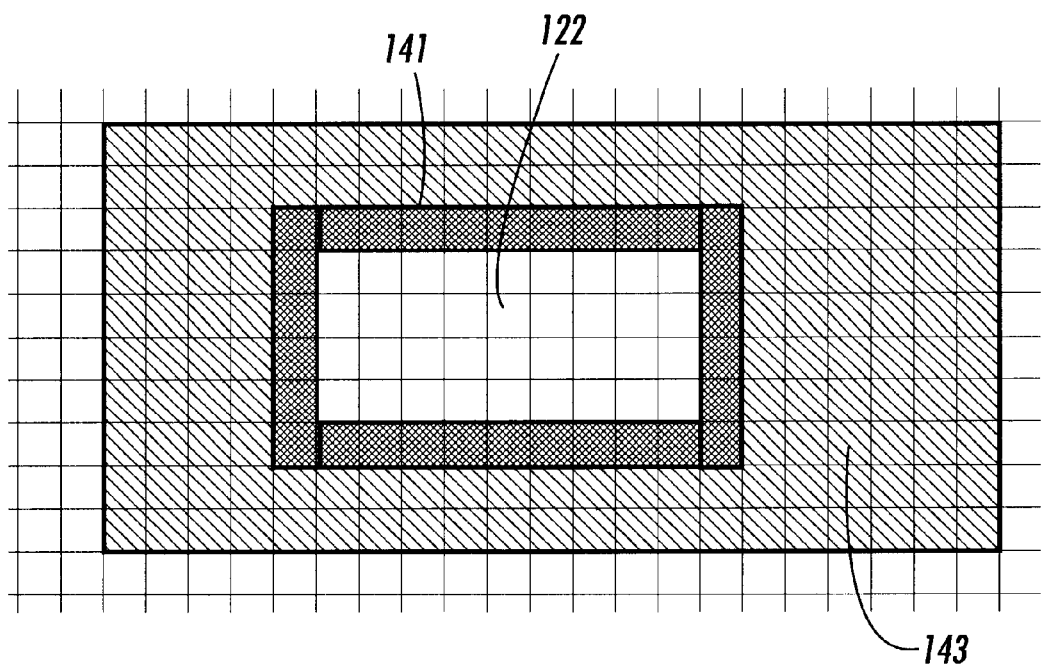
FIG. 4 illustrates the effects of the trapping of FIG. 3.

Since there is both a horizontal component and a vertical component in each of the two tests that compare the image values of the target pixel and each of the selected two diagonally neighboring pixels, horizontal, vertical and diagonal edges are all detected. Thus, the systems and methods according to this invention can perform twice as fast as the known four-connected techniques illustrated in FIGS. 1 and 2, and four times as fast as the known eight-connected techniques illustrated in FIGS. 3 and 4.

In an alternative exemplary embodiment of the methods and systems of this invention, all four diagonal neighbors can be compared with the target pixel to determine if edges exist between any of the four diagonal neighbors and the target pixel. However, this alternative embodiment of the methods and systems of this invention is slower than the embodiment of the methods and systems of this invention using two diagonal neighbors.

In an exemplary embodiment of the systems and methods of this invention, once a diagonal edge is detected, or alternatively, after all of the diagonal edges are detected, for each color, a conventional trapping technique can be used to determine a trapping color and which side of the edge the trap overlap should occur.

Figure 6:
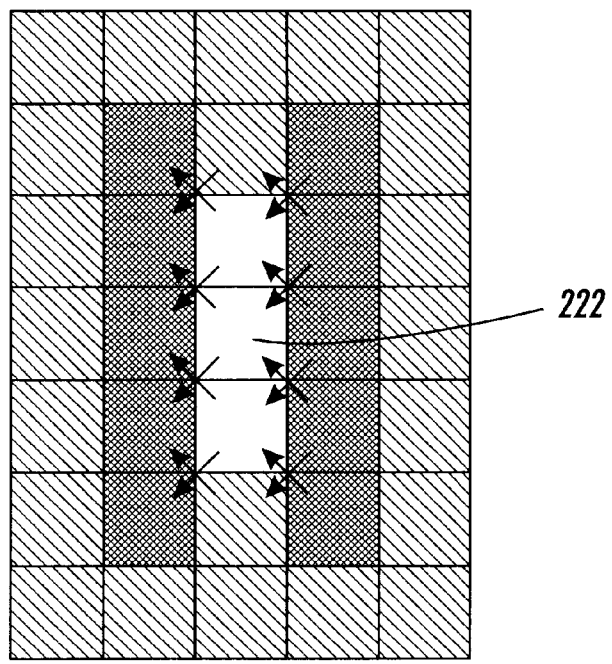
FIG. 6 illustrates one possible scenario using the process of this invention for a single pixel wide vertical line.
Figure 7:
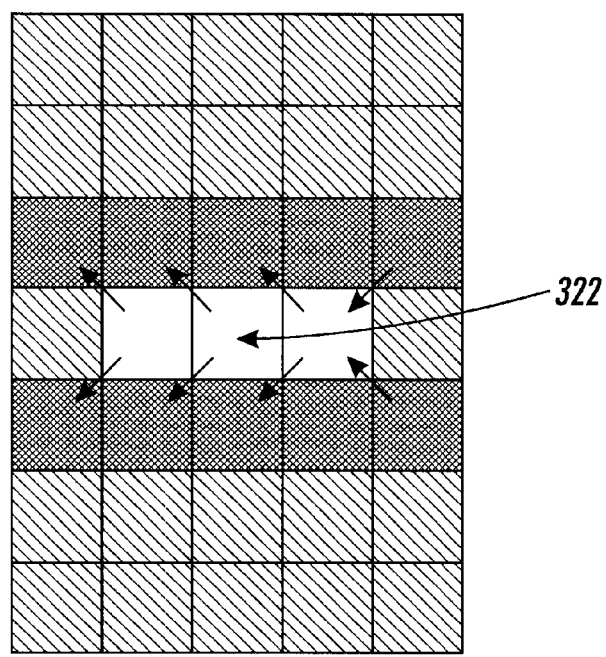
FIG. 7 illustrates another possible scenario for the systems and methods of the present invention for single pixel wide horizontal lines.
Figure 8:
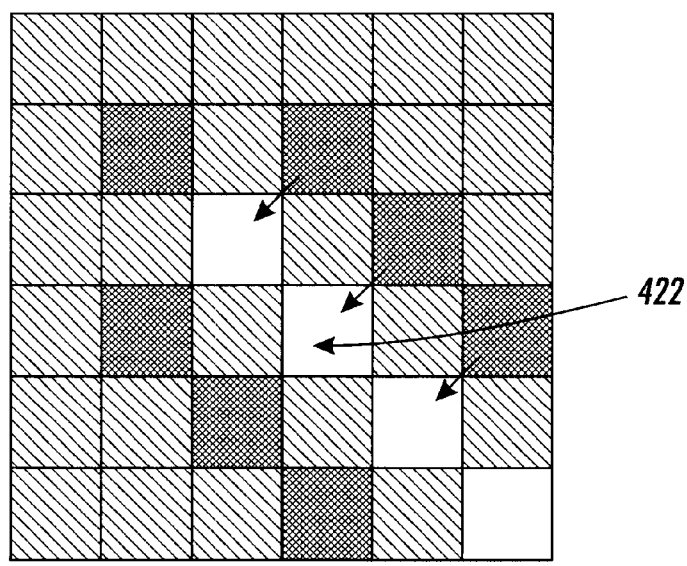
FIG. 8 illustrates a third possible scenario for the methods and systems of this invention for a single pixel wide 45° line.

While exemplary methods and systems according to this invention lower the time required for detecting images up to four-fold, the methods and systems according to this invention may fail to detect all edges in three situations, namely single pixel wide vertical lines, such as single pixel wide line 222 illustrated in FIG. 6, single pixel wide horizontal lines, such as single pixel wide line 322 as illustrated in FIG. 7 and, possibly, single pixel wide 45° lines, such as single pixel wide line 422 as illustrated in FIG. 8. However, for the majority of trapping applications, none of these three situations are considered to be significant cases, and the improvement in time provided by the methods and systems of this invention far outweigh any disadvantages arising from these three situations.

Figure 9:
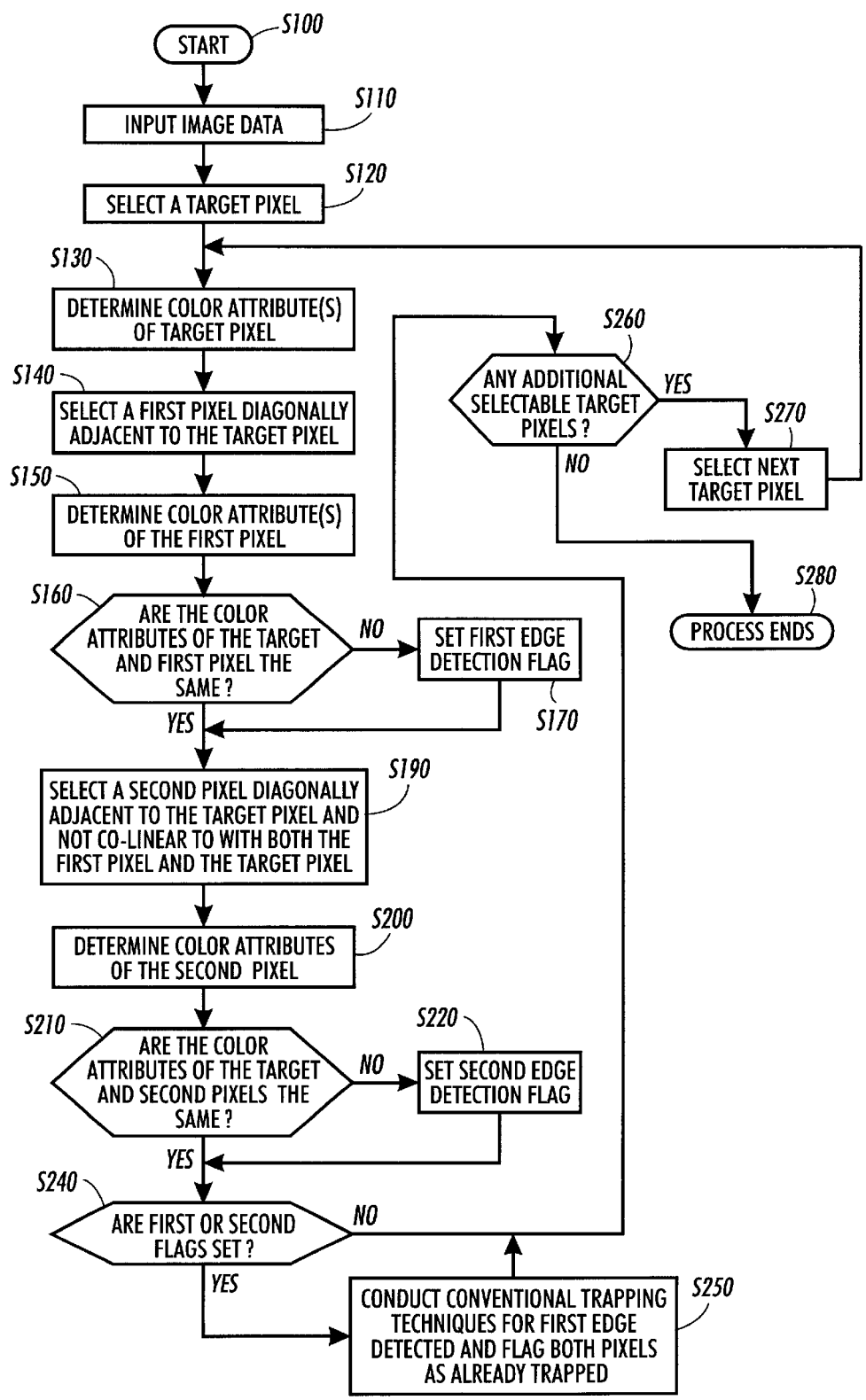
FIG. 9 is a flow chart outlining one exemplary embodiment of a process for determining if an edge exists in an image using a series of pixels in accordance with this invention.

FIG. 9 is a flowchart outlining one exemplary embodiment of a process for trapping images using diagonal edge detection according to this invention. Beginning in step S100, control continues to step S110, where image data is input. Then, in step S120, a first pixel is selected as the target pixel. Next, in step S130, one or more image value attributes of the target pixel are determined. Control then continues to step S140.

In step S140, a first pixel that is diagonally adjacent to the target pixel is selected. Then, in step S150, one or more image value attributes of the first pixel are determined. Next, in step S160, a determination is made whether each of the one or more image value attributes of the target pixel and the first pixel are the same or are within a preselected range of each other. If the attributes are not the same, or are within the preselected range, control continues to step S170. Otherwise, control jumps to step S190.

In step S170, because an edge has been determined to be present, a first edge detection flag is set. Control proceeds to step S190.

In step S190, a second pixel that is diagonally adjacent to the target pixel and that is not colinear with the first diagonally-adjacent pixel, is selected. Next, in step S200, one or more image value attributes of the second pixel are determined. Then, in step S210, a determination is made whether each of the one or more image value attributes of the target pixel and the second pixel arm the same or are within a preselected range of each other. If they are not the same or within a preselected range, control proceeds to step S220. Otherwise, control jumps to step S240.

In step S220, because an edge has been determination to be present, a second edge detection flag is set. Control proceeds to step S190.

In step S240, a determination is made whether either or both of the first and/or second flags have been set. If either or both flags have been set, control proceeds to step S250. Otherwise, control jumps to step S260.

In step S250, conventional trapping processes are applied, and both pixels are flagged as already trapped. Control then proceeds to step S260.

In step S260, a determination is made whether there are any additional selectable target pixels. If so, control proceeds to step S270 where a next target pixel is selected and then to step 130 where each of the steps S130–S230 are then repeated for the next target pixel. Otherwise, control continues to step S280, where the control process ends.

In most images analyzed using the systems and methods according to this invention, every pixel of the image is analyzed. However, the methods and systems of this invention could be applied selectively using any desired selection criteria. For example, the methods and systems of this invention could be applied only where edges are detected, such as where there are large differences between the attribute values of neighboring pixels, or two areas of high variance, such as where the values of pixels differ greatly from the average attribute values for the pixels in the same neighborhood.

Figure 10:
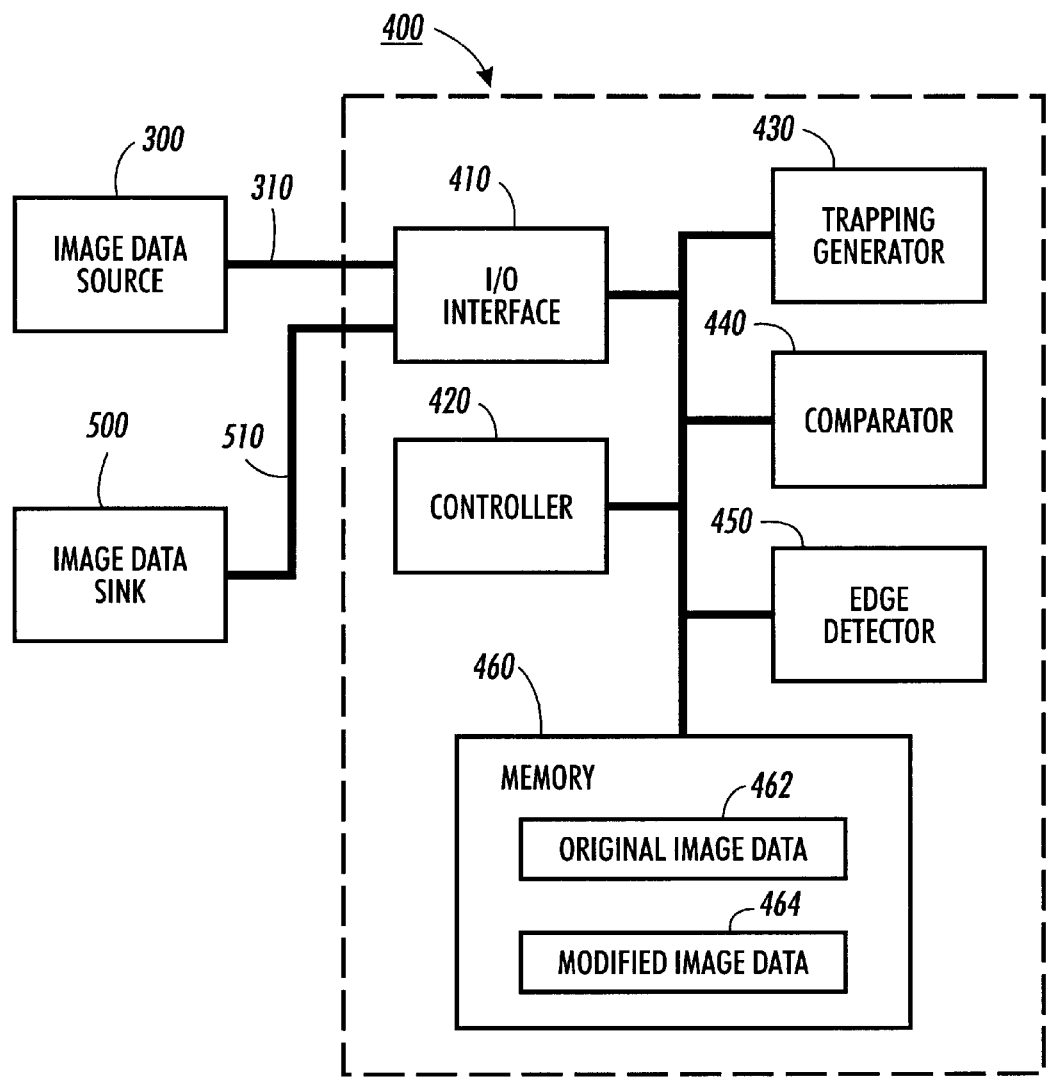
FIG. 10 is a functional block diagram outlining in greater detail one exemplary embodiment of the edge detecting system according to this invention.

FIG. 10 is a functional block diagram of one exemplary embodiment of a trapping and edge detection system in accordance with this invention. Images are input from an image data source 300 over a signal line or link 310 to a trapping and edge detection system 400. The filtered images are output from the trapping and edge detection 400 over a signal line or link 510 to an image data sink 500. The trapping and edge detection edge detecting system 400 includes an input/output interface 410, a controller 420, a trapping generator 430, a comparator 440, an edge detector 450 and a memory 460. The memory 460 includes an original image data portion 462 and a modified image data portion 464.

As shown in FIG. 10, the trapping and edge detecting system 400 is connected to the image data source 300 over the signal lines or links 310. The image data source 300 provides multi-bit-valued image data. In general, the image data source can be any one of a number of different sources, such as a scanner, a digital copier, a camera, a facsimile device that is suitable for generating electronic image data, or a device suitable for storing and/or transmitting electronic image data, such as a client or server of a distributed network, an intranet, an extranet or the Internet, and especially the World Wide Web.

Thus, the image data source 300 can be any known or later developed source that is capable of providing image data to the trapping and edge detection system 400 of this invention. Similarly, the image data sink 500 can be any known or later developed device that is capable of receiving the enhanced image data output by the trapping and edge detection system 400 and either storing or printing the trapped image data.

The signal lines or links 310 and 510 can each be any known structure or apparatus for transmitting the enhanced image data to or from the trapping and edge detecting system 400 from or to a physically remote storage or display device. Thus, the signal lines or links 310 and 510 can each be a public switched telephone network, a local or wide area network, an intranet, the Internet, a wireless transmission channel, any other distributing network, or the like. Similarly, the storage device can be any known structural apparatus for indefinitely storing the enhanced image data, such as a RAM, a hard drive and disk, a floppy drive and disk, an optical drive and disk, a flash memory or the like.

Moreover, the trapping and edge detecting system 400 can be implemented as software executing on a programmed general purpose computer, a special purpose computer, a microprocessor or the like. In this case, the trapping and edge detection system 400 can be implemented as a routine embedded in a printer driver, as a resource residing on a server, or the like., The trapping and edge detecting system 400 can also be implemented by physically incorporating it into a software and/or hardware system, such as the hardware and software systems of a printer or a digital photocopier.

While FIG. 10 shows the trapping and edge detecting system 400 as a separate device from the image data source 300, the trapping and edge detecting system 400 may be an integrated device, such as a digital copier, computer with a built-in printer, or any other integrated device that is capable of producing a hard copy image output. With such a configuration, for example, the image data source 300, the trapping and edge detecting system 400 and the image data sink 500 may be contained within a single device.

Alternatively, the trapping and edge detecting system 400 may be a separate device attachable upstream of a stand alone image data sink 500. For example, the trapping and edge detecting system 400 may be a device which interfaces with both the image data source 300 and image data sink 500. For example, the trapping and edge detecting system 400 may be incorporated into a network print server that manages printer data for a plurality of the same or different printer devices.

Furthermore, the trapping and edge detecting system 400 may be implemented as software on the image data sink 500 or the image data source 300. Other configurations of the elements shown in FIG. 1 may be used without departing from the spirit and scope of this invention.

The comparator 440 compares one or more image value attributes of the target and selected neighboring pixels.

In operation, image data is input from the image data source 300 into the input/output interface 410 and stored into the original image data portion 462 of the memory 460 under the control of the controller 420. The controller 420 picks, one at a time, a target pixel from the original image data stored in the original image data portion 462. The sets of data for each target pixel are stored in the memory 460, or could be forwarded directly to the comparator 440. The comparator 440, under control of the controller 420, inputs one or more image data attribute information for pairs of the diagonally adjacent pixels from the memory 460 and compares the one or more image data attributes to corresponding image data attributes of the target pixel to generate comparison results indicating the relationship between the selected pairs of pixels. The edge detector 450, under the control of controller 420, and based on the comparison results of the comparator 440, determines whether an edge exists between the target pixel and its two diagonal neighbors. The trapping generator, under the control of controller 420, and based on the results of edge detector 450, can determine what adjustments need to be made to the image data, and can make such adjustments and store any new edge information in the modified image data portion 464.

The processed or modified image data stored in modified image data 464 is output by input/output interface, under the control of controller 420, to the image data sink 500. The image formed by the modified image data can be displayed on a display or printed by a printer onto a recording medium or otherwise stored on a recording medium.

As shown in FIG. 10, the trapping and edge detection system 400 can be implemented on a programmed general purpose computer. However, the trapping and edge detection system 200 can also be implemented on a special purpose computer, a programmed microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowchart shown in FIG. 9, can be used to implement the edge detecting system.

The alterable memory 460 of the edge detecting system, as shown in FIG. 10, can be implemented using static or dynamic RAM. However, the alterable memory 460 can also be implemented using a floppy disk and disk drive, a writable optical disk and disk drive, a hard drive, flash memory or the like.

It should be understood that each of the elements 410–460 shown in FIG. 8 can be implemented as portions of a suitably programmed general purpose computer. Alternatively, each of the elements 410–460 shown in FIG. 10 can be implemented as physically distinct hardware circuits within an ASIC, or using a FPGA, a PDL, a PLA or a PAL, or using discrete logic elements or discrete circuit elements. The particular form each of the elements 410–460 shown in FIG. 10 will take is a design choice and will be obvious and predictable to those skilled in the art.

Further, it should be appreciated that the signal lines or links 310 or 510 connecting the image data source 300 and the image data sink 500 to the trapping and edge detection system 400 can be wired or wireless links to a network (not shown). The network can be a local area network, a wide area network, an intranet, the Internet, or any other distributed processing and storage network.

While this invention has been described in conjunction with the specific embodiments outlined above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of the invention.

What is claimed is:

1. A method for determining whether trapping is required for an image having a plurality of pixels, each pixel having a multi-bit image data value, the method comprising:

selecting a target pixel; and comparing at least one image data value attribute of the target pixel with at least one image data value attribute only from pixels that diagonally neighbor the target pixel in order to determine whether the trapping should be performed.

2. The method of claim 1, wherein the pixels that diagonally neighbor are at least two pixels.

3. The method of claim 1, wherein all of the pixels diagonally neighboring and the target pixel are not colinear.

4. The method of claim 3, wherein the at least two diagonally neighboring pixels consist of only one of a) through d):

a) the upper right and lower right diagonally neighboring pixels of the selected pixel;

b) the upper left and upper right diagonally neighboring pixels of the selected pixel;

c) the upper left and lower left diagonally neighboring pixels of the selected pixel; or d) the lower right and lower left diagonally neighboring pixels of the selected pixel.

5. The method of claim 1, wherein the at least two diagonally neighboring pixels comprise one of a) through d):

a) the upper right and lower right diagonally neighboring pixels of the selected pixel;

b) the upper left and upper right diagonally neighboring pixels of the selected pixel;

c) the upper left and lower left diagonally neighboring pixels of the selected pixel; or d) the lower right and lower left diagonally neighboring pixels of the selected pixel.

6. The method of claim 1, wherein the at least two diagonally neighboring pixels consist of only one of a) through d):

a) the upper right and lower right diagonally neighboring pixels of the selected pixel;

b) the upper left and upper right diagonally neighboring pixels of the selected pixel;

c) the upper left and lower left diagonally neighboring pixels of the selected pixel; and d) the lower right and lower left diagonally neighboring pixels of the selected pixel.

7. The method of claim 6, wherein each diagonally neighboring pixel is immediately neighboring to the target pixel.

8. The method of claim 6, wherein each diagonally neighboring pixel is spaced a distance from the target pixel.

9. The method of claim 6, further comprising trapping the image using a conventional trapping approach.

10. A medium, comprising:

a recording layer;

a set of machine readable code recorded on the recording layer;

wherein the set of machine readable code includes instructions for performing the method of claim 6.

11. The method of claim 1, wherein each diagonally neighboring pixel is immediately neighboring to the target pixel.

12. The method of claim 1, wherein each diagonally neighboring pixel is spaced a distance from the target pixel.

13. The method of claim 1, further comprising trapping the image using a conventional trapping approach.

14. A medium, comprising:

a recording layer;

a set of machine readable code recorded on the recording layer;

wherein the set of machine readable code includes instructions for performing the method of claim 1.

15. A system for trapping an image having a plurality of pixels, each pixel having a multi-bit image data value, the system comprising:

a memory for containing image data attributes of an image having a plurality of pixels;

a comparator that compares a pixel attribute of a selected pixel in an image only with diagonally neighboring pixels in order to determine whether the trapping should be performed;

an edge detector that determines, based on information from the comparator, if edges are present between the selected pixel and the neighboring pixels; and a trapping generator that generates a diagonal, horizontal or vertical trapping of at least some of the objects formed by at least some of the pixels in the image based on edge determination information from the edge detector.

16. The system of claim 15, wherein the diagonally neighboring pixels consist of only one of a) through d):

a) the upper right and lower right diagonally neighboring pixels of the selected pixel;

b) the upper left and upper right diagonally neighboring pixels of the selected pixel;

c) the upper left and lower left diagonally neighboring pixels of the selected pixel; and d) the lower right and lower left diagonally neighboring pixels of the selected pixel.

17. A method of determining a location of an edge in an image, comprising:

selecting a target pixel;

comparing at least one image data value attribute of the target pixel with a group of pixels consisting only of two pixels that are each diagonally and immediately neighboring the target pixel in order to determine whether trapping should be performed, all of the two pixels and the target pixel not being colinear; the two pixels being selected from the upper right and lower right diagonally immediately neighboring pixels of the selected pixel; the upper left and upper right diagonally immediately neighboring pixels of the selected pixel; the upper left and lower left diagonally immediately neighboring pixels; or the lower right and lower left diagonally immediately neighboring pixels of the selected pixel;

determining a trapping color;

determining on which side of the edge a trap overlap should occur; and trapping the image.

* * * * *